United States Patent
McCulloch et al.

[11] Patent Number: 5,193,662
[45] Date of Patent: Mar. 16, 1993

[54] GUIDE STRUCTURE FOR LIFT AND CARRY CONVEYORS

[75] Inventors: Charles E. McCulloch; Michael J. Peabody, both of Bloomfield Hills, Mich.

[73] Assignee: Durr Automation, Inc., Davisburg, Mich.

[21] Appl. No.: 861,086

[22] Filed: Mar. 31, 1992

[51] Int. Cl.⁵ ............................................. B65G 25/00
[52] U.S. Cl. ................................................ 198/774.1
[58] Field of Search ............... 198/774.1, 774.2, 774.3, 198/774.4, 775, 776, 778

[56] References Cited

U.S. PATENT DOCUMENTS

| | | | |
|---|---|---|---|
| 3,599,782 | 8/1971 | Whitfield | 198/778 X |
| 3,613,869 | 10/1971 | Schuricht | 198/778 X |
| 4,026,409 | 5/1977 | Stockdale | 198/774.3 |
| 4,042,104 | 8/1977 | Furlette et al. | 198/774.3 |
| 4,071,137 | 1/1978 | Fink | 198/774.2 |
| 4,155,443 | 5/1979 | Schuricht | 198/774.3 |
| 4,254,861 | 3/1981 | Schuricht | 198/774.3 |
| 4,299,323 | 11/1981 | Koch et al. | 198/778 X |
| 4,496,042 | 1/1985 | Rise | 198/774.3 |
| 4,838,411 | 6/1989 | Rainey et al. | 198/774.3 |
| 4,951,804 | 8/1990 | McCulloch et al. | 198/774.1 X |

FOREIGN PATENT DOCUMENTS 3440601   5/1986   Fed. Rep. of Germany ... 198/774.1

*Primary Examiner*—D. Glenn Dayoan
*Attorney, Agent, or Firm*—Dykema Gossett

[57] ABSTRACT

An improvement in lift and carry conveyor systems includes the use of fixed guide rails which guide lower portions of a part as the part moves between sequential conveyor sections. The guide rails ensure that the part continues to be properly guided as it moves between the sequential stations, or between a workstation and a conveyor section. Further, the lift members are formed of aluminum extrusions and have plastic inserts.

10 Claims, 2 Drawing Sheets

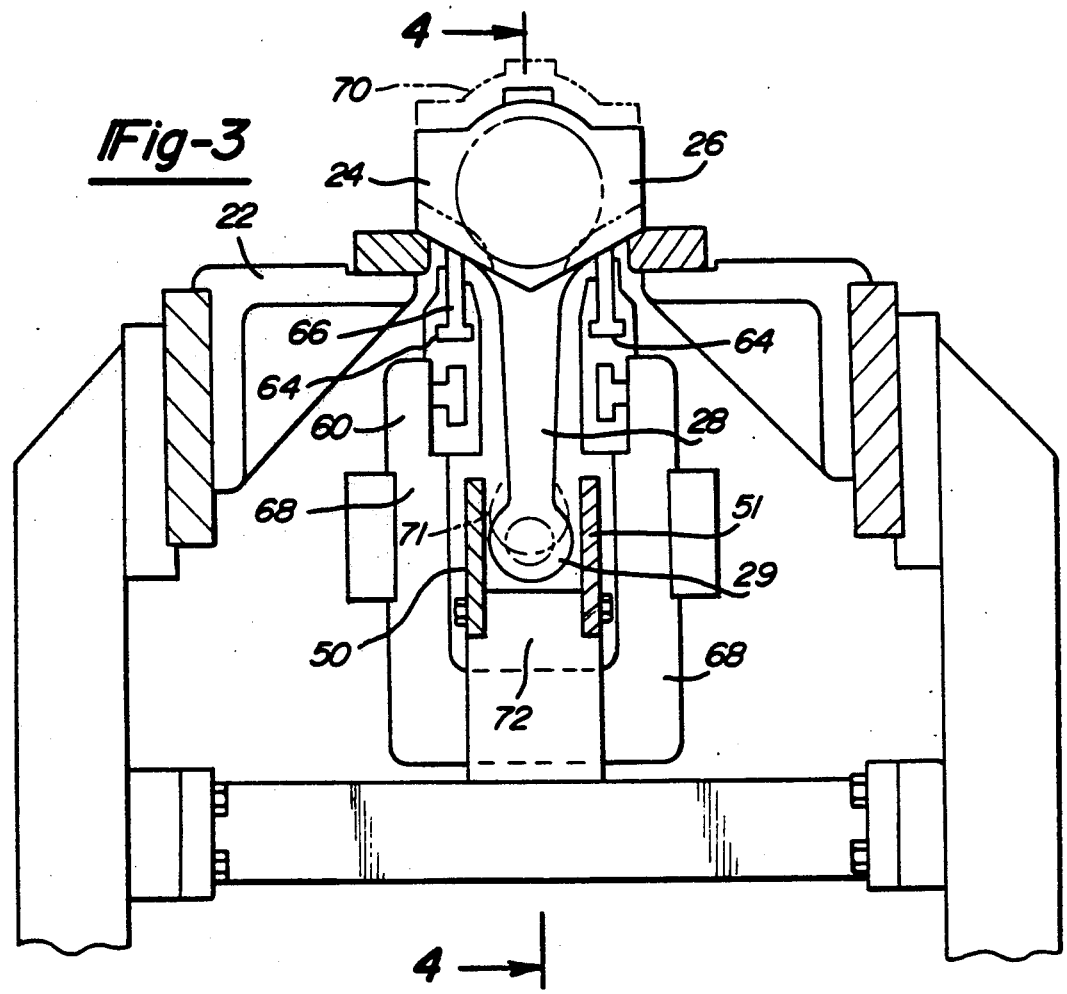
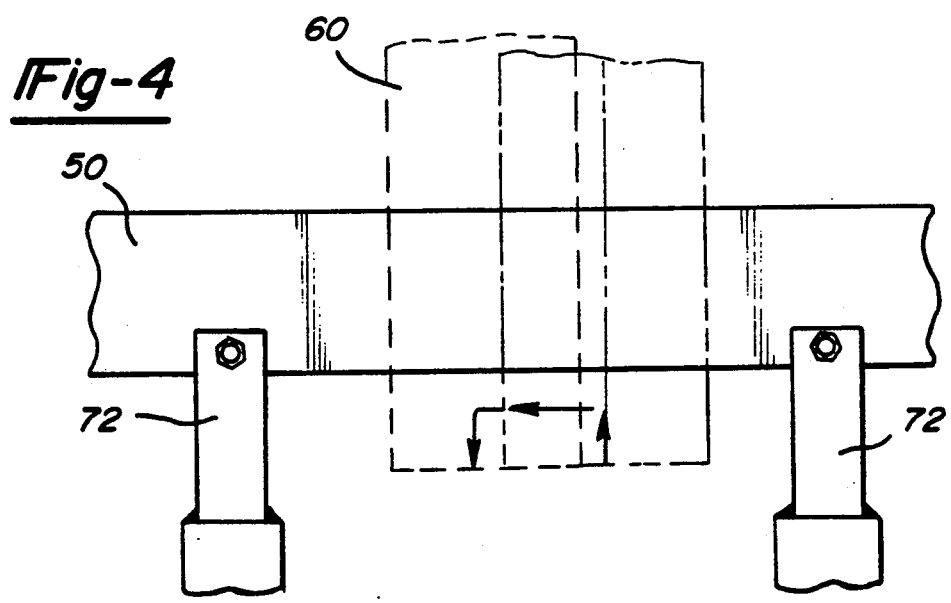

GUIDE STRUCTURE FOR LIFT AND CARRY CONVEYORS

BACKGROUND OF THE INVENTION

This application relates to an improvement in guide structure for lift and carry conveyor systems.

In the prior art, so-called lift and carry conveyors are used to move parts along an industrial line. A lift and carry conveyor may move parts from a first machining station along a conveyor path towards a second station where further work is performed on the part. As the conveyed parts move along the factory floor, they are transferred between sequential lift and carry sections. Recently, it has become known in the prior art to turn the parts through a corner to connect two linearly extending sequential lift and carry sections.

For certain types of parts, prior art lift and carry conveyors have used containment rails which guide the parts as they move on the lift and carry conveyors. As shown in prior art FIG. 1, a prior art lift and carry conveyor 20 included fixed supports 22 which hold a part 24. Part 24 may be a connecting arm for a piston having a ring 26 and an arm 28 with a cylindrical surface 29. Ring 26 may be relatively thin in a direction into the paper, such that it must retain the position shown in this figure or it may fall between fixed supports 22.

A prior art lift and carry member 30 has lift surfaces 32 which sequentially engage an under surface of ring 26 and lift part 24 vertically upwardly off of fixed supports 22. Lift and carry member 30 and part 24 are then moved along a conveyor path. Lift and carry member 30 is then returned vertically downwardly, and part 24 is again rested on fixed supports 22 at a downstream location. Lift and carry member 30 returns upstream to its original location at the lowered vertical location. As described and claimed in this application, it should be understood that these movements may be elliptic rather than four distinct linear movements. During this movement, containment rails 34 move with lift and carry member 30 and remain aligned with cylindrical surface 29 and a lower end of arm 28. Containment rails 34 prevent part 24 from becoming misaligned as it moves along the conveyor path.

Problems arise with this type of conveyor system in that during transfer of parts between adjacent lift and carry sections, the containment rails 34 no longer guide the part 24. Thus, the prior art has experienced some difficulty in properly guiding parts as they are moved onto, or off of lift and carry sections.

SUMMARY OF THE INVENTION

In a disclosed embodiment of the present invention, fixed guide rails extend along the entire conveyor path. Thus, the guide rails extend through locations between sequential lift and carry sections, and continue to guide the parts as the parts move along the conveyor path. Preferably, the guide rails are positioned within the lateral extent of the lift and carry member, such that the lift and carry member may support and move the part in the typical known fashion. The location of the guide rails within the lateral extent of the lift and carry member, and along the entire conveyor length, ensures that the part does not become misaligned as it moves between sequential lift and carry sections.

In one disclosed embodiment of the present invention, the conveyor system includes two linear lift and carry sections, which extend along perpendicular paths, and a turn lift and carry section which turns parts from the first of the two linear lift and carry sections, to the second.

In a further feature of the present invention, the lift surfaces of the lift and carry member are formed of aluminum extrusions. Plastic inserts are inserted into the aluminum extrusions to provide a less abrasive contact surface with the part.

These and other features of the present invention can be best understood from the following specification and drawings, of which the following is a brief description:

BRIEF DESCRIPTION OF THE DRAWINGS

FIG. 3 is a cross-sectional view, similar to that shown in FIG. 1, but of the inventive lift and carry member.

FIG. 4 is a cross-sectional view along line 4—4 as shown in FIG. 3.

DETAILED DESCRIPTION OF A PREFERRED EMBODIMENT

Figure 1:
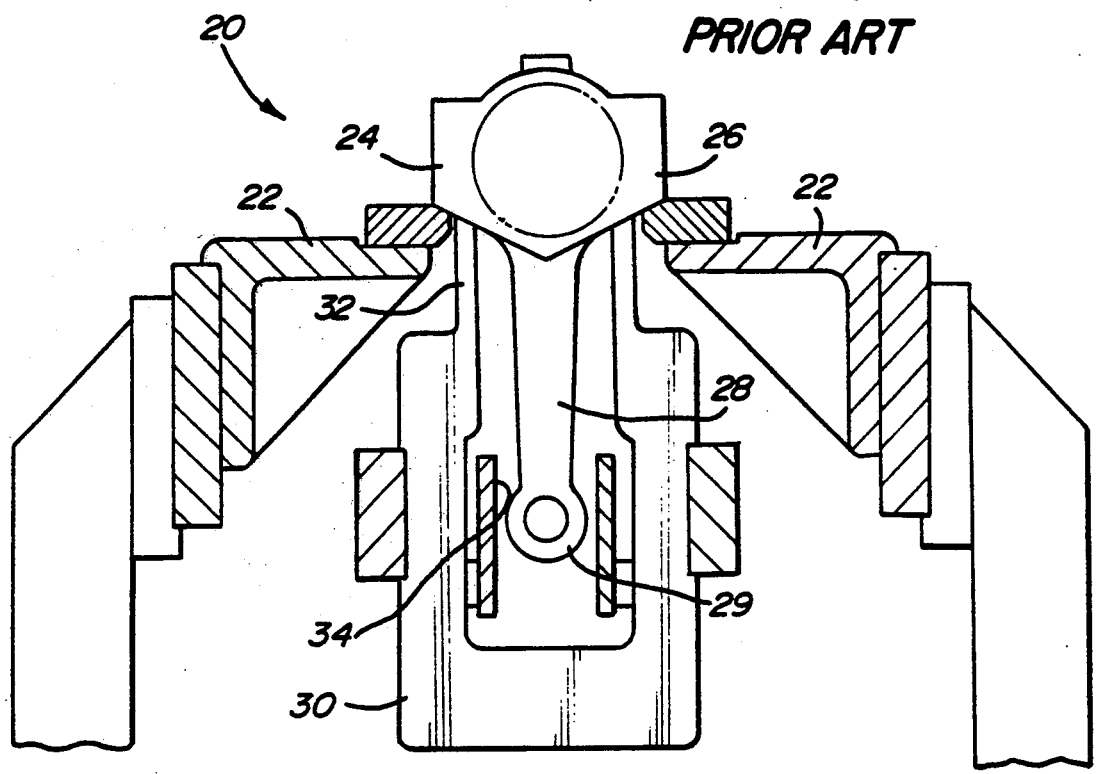
FIG. 1 is a cross-sectional view through a prior art lift and carry conveyor.
Figure 2:
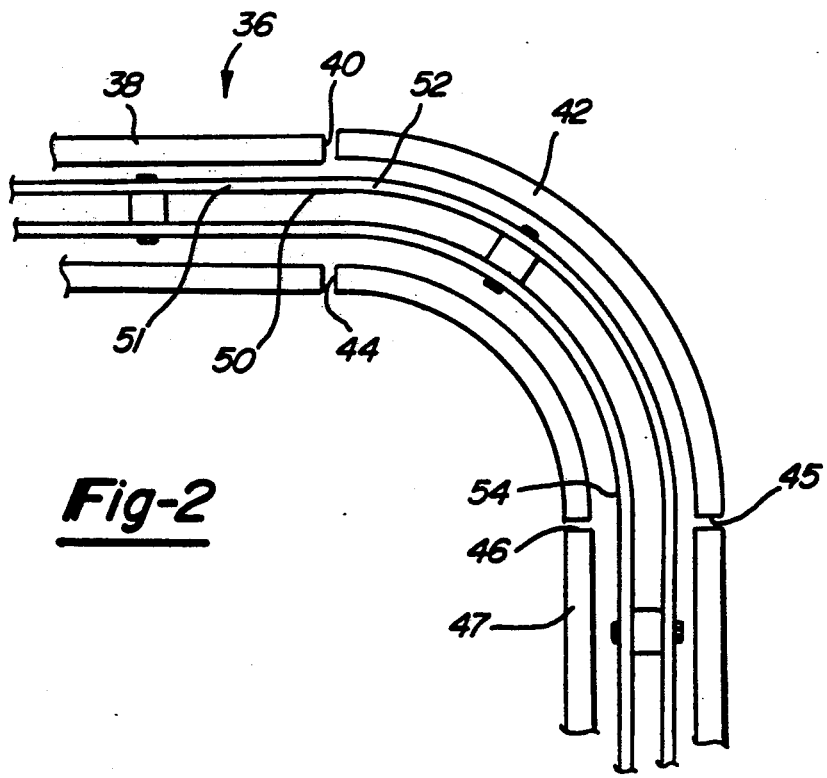
FIG. 2 is a largely schematic top view of a conveyor system incorporating the present invention.

FIG. 2 shows a conveyor system 36 incorporating a first linear lift and carry section 38 extending to a downstream end 40. A turn lift and carry section 42 turns parts from an upstream end 44 to a downstream end 45. At downstream end 45, the parts are transferred to an upstream end 46 of a second linear lift and carry section 47. Thus, parts move along the first lift and carry section 38 linearly, and are turned through turn section 42, which may be a lift and carry section as is disclosed in U.S. Pat. No. 4,951,804. The parts then move from turn section 42 to the second linear section 47.

A pair of guide rails 50 and 51 extend throughout the conveyor path. A section 52 spans the interface between first linear section 38 downstream end 40, and upstream end 44 of turn section 42. A section 54 of rails 50 and 51 spans the interface of downstream end 45 of turn section 42, and upstream end 46 of second linear section 47. As the lift and carry members associated with lift and carry sections 36, 42 and 47 move their relative positions changes, and consequently the distance between the adjacent sections also changes. Guide rails 50 and 51 ensure continuous guidance. Further, the fixed guide rails reduce wear on the part and on the rails over the prior art conveyors.

As shown in FIG. 3, with conveyor system 36, the fixed supports 22 are similar to the prior art. Part 24 is identical.

Lift and carry member 60 has aluminum extrusion support members 64 with plastic inserts 66 to reduce wear on parts 24. Fixed guide rails 50 and 51 are positioned laterally inwardly of spaced arms 68 of lift and carry member 60. As shown, guide rails 50 and 51 extend vertically above cylindrical surface 29 of part 24, such that they guide cylindrical surface 29 during movement of part 24.

As is typical in the prior art, lift and carry member 60 initially lifts part 24 to a position 70 shown in phantom. At that location, cylindrical surface 29 is at a position 71 shown in phantom. As shown, rails 50 and 51 are still vertically aligned with cylindrical surface 29, such that they continue to guide part 24.

Thus, as part 24 moves downstream along a conveyor path, guide rails 50 and 51 continuously guide the part. As the part moves from a first linear section 38 to turn section 42, guide rail section 52 continues to guide the part. As the part moves from turn section 42 to second linear section 47, section 54 continues to guide the part. Guide rails 50 and 51 are supported between lift and carry member 60 and an adjacent section on block 72.

As shown in FIG. 4, spaced blocks 72 fix rail 50 relative to lift and carry member 60. As also shown, rail 50 extends beyond the longitudinal extent of lift and carry member 60. The relative longitudinal extent of lift and carry member 60 is reduced to illustrate the blocks 72. Rail 51 has similar features.

Although the present invention has been shown with two linear sections and a turn section interconnecting the two, the inventive features would also apply to adjacent linear conveyor sections, and also to moving parts from a machine onto a conveyor section, or moving parts from a conveyor to a distribution point. Further, the guide rails may sometimes only be necessary at the interface between adjacent sections.

A preferred embodiment of the present invention has been disclosed, however, a worker of ordinary skill in the art would recognize that certain modifications would come within the scope of this invention. For that reason, the following claims should be studied in order to determine the true scope and content of this invention.

We claim:

1. A conveyor system comprising:
   at least one lift and carry member having laterally spaced lift surfaces which are alternately movable vertically upwardly from a starting position, longitudinally along a conveyor path at a vertically upper position, vertically downwardly, and longitudinally rearwardly at a vertically lowered position to said starting position;
   a pair of laterally spaced fixed guide rails positioned laterally between said lift surfaces, said fixed guide rails remaining stationary during movement of said lift surfaces;
   said fixed guide rails extend beyond both longitudinal ends of said lift and carry member throughout its movement; and
   said fixed guide rails are supported on fixed blocks beyond said longitudinal ends of said lift and carry member.

2. A conveyor system as recited in claim 1, wherein said lift and carry member is adapted to support a part having an upper portion of a first great lateral dimension, and a lower portion of a second smaller lateral dimension, said upper portion engaging said lift surfaces, and said lower portion being positioned laterally between said fixed guide rails throughout movement of the part.

3. A conveyor system as recited in claim 1, wherein said lift and carry member includes fixed support surfaces positioned laterally outwardly of said lift surfaces.

4. A conveyor system as recited in claim 1, wherein there are a plurality of said lift and carry members, and said fixed guide rails extend longitudinally along all of said lift and carry members.

5. A conveyor system as recited in claim 4, wherein a first lift and carry member leads linearly to a second turn lift and carry member, which turns through 90° to a third lift and carry member leading linearly.

6. A conveyor as recited in claim 1, wherein said lift surfaces are formed of aluminum extrusions.

7. A conveyor as recited in claim 6, wherein plastic inserts are inserted in said aluminum extrusions, and contact the part.

8. A conveyor system comprising:
   a plurality of lift and carry members each having laterally spaced lift surfaces which are alternately movable vertically upwardly from a starting position, longitudinally along a conveyor path at a vertically upper position, vertically downwardly, and longitudinally rearwardly at a vertically lowered position to said starting position; and
   a pair of laterally spaced fixed guide rails positioned laterally between said lift surfaces, said fixed guide rails remaining stationary during movement of said lift and carry members and bridging longitudinal gaps between said plurality of lift and carry members.

9. A conveyor system as recited in claim 8, wherein said fixed guide rails remaining stationary during movement of said lift surfaces, and said fixed guide rails extending throughout the longitudinal extent of said plurality of lift and carry members.

10. A conveyor system as recited in claim 8, wherein there is a first lift and carry members leading linearly to a second turn lift and carry members, which turns through 90° to a third lift and carry members leading linearly.

* * * * *